United States Patent [19]
Marchesi

[11] 3,795,144
[45] Mar. 5, 1974

[54] TAMPER-PROOF WATER METER
[76] Inventor: Ralph R. Marchesi, 881 Main St., Winchester, Mass. 01890
[22] Filed: Feb. 17, 1972
[21] Appl. No.: 227,091

[52] U.S. Cl. .................................. 73/201, 73/275
[51] Int. Cl. .............................................. G01f 1/00
[58] Field of Search ...... 73/201, 273, 275, 276, 277

[56] References Cited
UNITED STATES PATENTS

| | | | |
|---|---|---|---|
| 802,436 | 10/1905 | Van Order | 73/201 |
| 2,993,375 | 7/1961 | Whittaker | 73/258 |
| 1,122,967 | 12/1914 | Mass | 73/201 |
| 2,229,195 | 1/1941 | Smith | 73/201 X |
| 1,165,429 | 12/1915 | Mass | 73/201 X |
| 3,523,455 | 8/1970 | Branitzky | 73/273 X |

Primary Examiner—Herbert Goldstein
Attorney, Agent, or Firm—William C. Roch

[57] ABSTRACT

A tamper-proof plumbing arrangement for a water meter in an establishment for preventing the owner of the establishment from reversing or bypassing the water meter. The water meter has the internal shut-off valve for the establishment as an integral part of the meter such that the water meter cannot be removed while the shut off valve is closed. The water meter has a main housing which houses both the water meter and the shut off valve, and has a small, unbreakable window at the top of the meter to allow the meter to be read. The small Plexiglass window prevents the gauge reading from being altered by the customer.

9 Claims, 2 Drawing Figures

PATENTED MAR 5 1974 3,795,144

TAMPER-PROOF WATER METER

BACKGROUND OF THE INVENTION

The present invention relates generally to water meters, and more particularly pertains to a new and improved water meter wherein the water meter includes as an integral component thereof the internal shut-off valve for the establishment which the water meter is serving.

In the field of plumbing arrangements for water meters, it has been the general practice to place an internal shut-off valve on the main water pipe immediately after the main water pipe enters an establishment. A section of water pipe usually follows the shut-off valve, and connects to the inlet side of a water meter. The outlet side of the water meter then leads to the general plumbing of the establishment. The water meter normally includes a large glass dome on top of the main body of the meter to enable meter readings to be taken. The glass dome is attached to the main body of the meter by a number of retainer bolts positioned around the periphery of the glass dome. To prevent the glass dome from being removed and the gauge reading altered, a lead seal is normally connected through the retainer bolts. A clip lock is then utilized to secure the ends of the lead seal together.

Such prior art plumbing arrangements for water meters have been unsatisfactory in that it has been relatively easy for an informed and dishonest customer to defeat the metering system and steal water. Normally the plumbing couplings to the inlet and outlet sides of the water meter are the same size. One way of stealing water has been to close the shut-off valve, and then simply reverse the water meter so that water flows backwards through the meter. This caused the meter reading to decrease rather than increase not only giving free water but also eliminating the reading for water which was previously registered on the meter. Alternatively, while the shut-off valve was closed, the meter could be disconnected and a simple bypass pipe connected in its place. Another manner of tampering with this system was to change the reading on the gauge which indicates the amount of water consumed. The lead seal locking the glass dome in place and the clip attached to the ends of the lead seal are easily obtainable, and present little difficulty to a dishonest customer removing the seal, lifting the glass dome, changing the gauge reading, and putting a new seal and lock onto the water meter.

A satisfactory solution to this problem is urgently required by the community and also by honest water customers. The theft of water results in honest customers paying more per gallon for water, and in a higher rate of usage of water throughout the community. The honest customer must pay more for his water as he is paying for both his water and a proportionate share of the dishonest customer's water. The use of water by dishonest customers is generally increased, as there is not a cost incentive for them to curtail their usage of water. For instance, a dishonest water customer with a swimming pool might refill his swimming pool four or five times during a season instead of chemically treating the water in the pool and keeping it in the pool for a full season. Also, dishonest customers with large lawns generally tend to water their lawns more often as the resultant greener lawns do not cost them more money. This increased usage of water is detrimentally adding to water prices throughout the country. Also, with higher water prices caused by the theft there is a greater economic incentive for previously honest customers to turn dishonest and also start stealing water. Thus, the theft results in higher prices which in turn cause more theft and still higher prices, and a vicious cycle is started. Many communities and areas of the country face a continuing shortage of water. Further, many communities are constantly beseeching their citizens to use less water, and occasionally bans on the use of water for secondary purposes, such as watering lawns and filling swimming pools, are enforced.

With the water shortage in many communities reaching epidemic proportions, some means must be found of preventing the theft of water by customers. One community in Massachusetts recently estimated that as many as 30 percent of its customers were stealing water. The shortage of water in Massachusetts is reaching such dire proportions that a major newspaper in the Boston area recently ran a four part series on the water shortage problem throughout Massachusetts. The following were points brought out by this series of four articles. The demand for water in Massachusetts will exceed the yield of present water systems by 1975 which does not allow a sufficient amount of time to adequately expand the present water supplies. Per capita water use (representing industrial and personal use per person) in fully supplied communities is up this year from 5 to 11 gallons a day on monthly averages. A continuation of this trend means that by 1990 today's per capita consumption of 160 gallons per day will be up to 190 gallons per day. Water supply problems in Massachusetts are already reaching serious proportions. One community in Massachusetts recently lifted an almost year-long ban on new building imposed because of water shortage in that community. In a similar manner, water shortages in other communities could eventually curtail growth of those communities. As communities are using greater quantities of water, the cost of water appears almost certain to go up as the communities will be required to use lower quality water. With lower quality water, more treatment of the water is required, and the cost of the treated water increases in proportion to the amount of treatment required. This is yet another reason why an economic incentive is needed to encourage customers to curtail their usage of water.

A satisfactory solution to the theft of water by dishonest customers would bring relief to the general shortage of water in many communities and areas throughout the country.

One approach to preventing the theft of water is illustrated in U.S. Pat. No. 802,436, by Van Order, patented in 1905. In the Van Order Patent, a water meter is illustrated which prevents water from flowing backwards through the meter in the event the meter is reversed. Also, in the reversed position heated backwater from the house warps a member in the water meter which renders the meter inoperative. When the meter is restored to its proper position, water flows through the meter, but the meter fails to register the flow, thus yielding proof that the water meter had at one time been reversed. This system is obviously unsatisfactory since the water meter can be removed and a straight flow-through pipe connected in its place. Further, this system has the added disadvantage of rendering the meter inoperative after reversal is attempted, but still allowing water to flow through the meter when the meter is again placed in its proper position. Thus, after the water meter is reversed and the meter rendered inoperative, the meter can be returned to its correct position, and the customer will then receive free water until an agent of the water company notices that the water meter is not registering properly.

U.S. Pat. No. 3,355,945, by Perry, patented 1965, illustrates another approach to preventing the theft of water. In this system a molded plastic enclosure is mounted on the water meter to fully enclose the meter and the connections to the meter. The plastic material is of the type that reveals by discoloration when any attempt is made to obtain access to the meter or the connections thereto. This system is unsatisfactory in that it adds expense to the installation of a water meter in an establishment.

The Van Order Patent, issued in 1905, and the Perry Patent, issued in 1965, illustrate that there has been a long standing problem in the art to obtain a satisfactory invention which will prevent people from stealing water. Applicant's invention has provided a cost free and efficient solution to this long standing problem.

SUMMARY OF THE INVENTION

In accordance with a preferred embodiment, a water meter is disclosed wherein the internal shut off valve for an establishment is made an integral part of the water meter such that the water meter cannot be removed while the shut off valve is closed. This prevents either the reversing of a water meter or the connection of a bypass pipe in place of the meter. Further, the preferred embodiment provides a water meter wherein the gauge in the meter is visible through a small and unbreakable window, such that the window cannot be removed and the gauge reading changed.

Another advantage of applicant's invention is that the installation of this invention in a newly constructed establishment would not cost more than a prior art plumbing arrangement, and in fact might cost less. Also, the concept of this invention could be implemented on existing water meters by welding, or in some similar manner irremovably attaching, the internal shut-off valve for the establishment to the water meter itself such that the shut off valve is an integral part of the water meter.

DETAILED DESCRIPTION OF A PREFERRED EMBODIMENT

Figure 1:
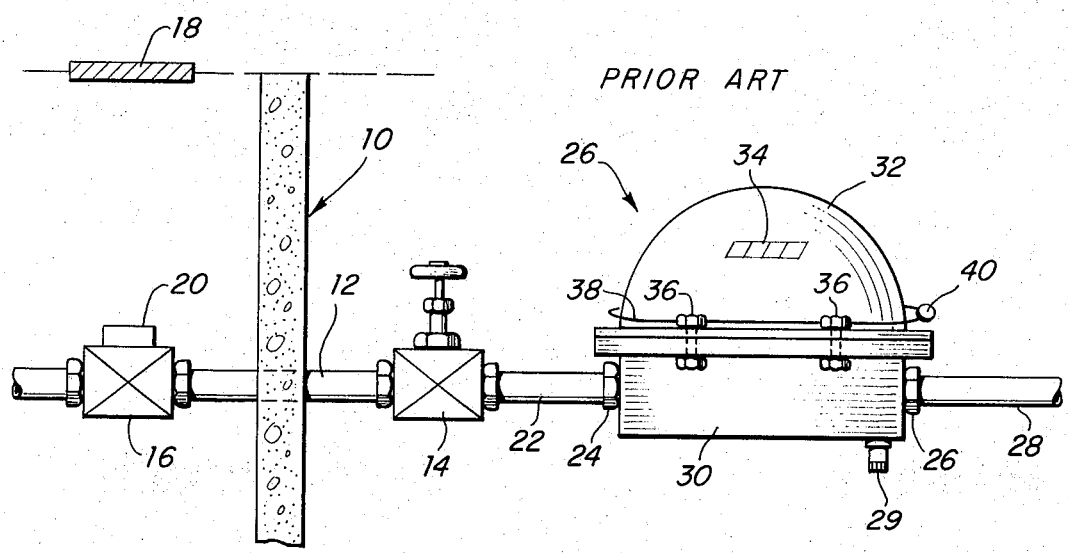
FIG. 1 illustrates a prior art plumbing arrangement for a water meter.

FIG. 1 illustrates a prior art plumbing arrangement for a water meter. A typical establishment, such as a house or a commercial building, has a foundation 10 through which an inlet water pipe 12 enters. The pipe 12 leads to an internal shut off valve 14. In a normal prior art arrangement, a second and external shut off valve 16 is positioned outside of the establishment, typically beneath the sidewalk, and is accessible to authorized servicemen of the water company through a cover 18. A wrench, several feet long, is required by an authorized serviceman to reach through the access cover 18 and into a valve fitting 20 on the external shut off valve 16. In this manner, if either the internal shut off valve or the entering pipe 12 bursts, a serviceman can still turn off the water to the establishment without shutting off the water supply to the whole neighborhood.

A pipe 22 leads from the internal shut off valve 14 to the inlet side 24 of a water meter 26. The pipe is connected to the internal shut off valve 14 and water meter 26 by typical plumbing couplings. Water enters the inlet side 24 of the water meter, travels through the meter registering the quantity of water used, and then flows through an outlet side 26 to a pipe 28 which leads to the general plumbing of the establishment. A drain valve 29 is normally provided in the meter to allow draining of all water from the plumbing of the establishment. A typical prior art water meter has a main metal housing 30 which houses the water meter mechanism, and a glass dome 32 which allows visual readings of the water meter gauge 34. Gauge 34 indicates the quantity of water which has flowed through the water meter. The glass dome 32 is normally attached to the metal housing 30 by a number of retainer bolts 36 which are secured around the periphery of the glass dome 32. To prevent the glass dome from being removed and the gauge reading altered, a lead seal 38 is normally connected through the retainer bolts 36. A clip lock 40 is then secured to the ends of the lead seal. In practice, the lead seal and clip lock are easily obtainable and present little difficulty to a dishonest customer removing the seal, lifting the glass dome, changing the reading, and putting a new seal and lock on the water meter.

Figure 2:
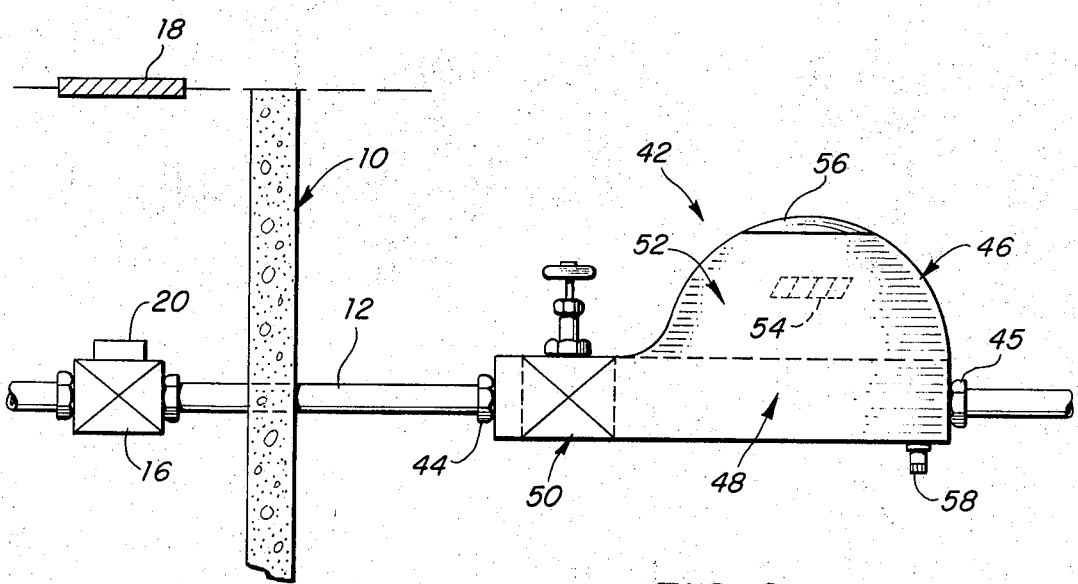
FIG. 2 illustrates a preferred embodiment of a water meter constructed in accordance with the teachings of this invention.

FIG. 2 illustrates a plumbing arrangement for a water meter constructed in accordance with the teachings of this invention. An inlet pipe 12 enters through the foundation 10 of an establishment. The inlet pipe 12 leads to a water meter 42 having an inlet side 44 and an outlet side 45. The water meter 42 has a main metal housing 46 which houses the mechanism of a water meter in a section 48 and the mechanical components of an internal shut off valve in a section 50. In the preferred embodiment section 50 is formed of a heavier gauge metal than the remaining sections of the housing to assist in preventing the shut off valve from being damaged if freezing should occur during cold weather. A third section 52 of the unitary metal housing 46 is formed over the top of gauge 54. Visual access to gauge 54 is obtainable through a small window 56 which is irremovably set in the top of housing 46, preferably by a seal fused to the metal housing. Window 56 is preferably as small as possible as a small window would make removal very difficult. In one embodiment the window may be constructed only as large as the numerals on the gauge 54. The window may be formed of an unbreakable material such as plastics like Plexiglass or Lexan, or glass such as Herculite glass. In one embodiment, the meter section may be immersed in water under pressure from the water supply. The advantage of this embodiment is that breaking of the window would be discouraged as it would cause flooding of the establishment. The water meter includes a drain valve 58 which is preferably attached to the water meter after the metering section 48.

An external shut off valve 16 is normally located outside the establishment, as illustrated in FIG. 1, such that the water supply to the establishment can be shut off outside by a serviceman.

On the inside of the establishment, there is no way in which the internal shut off valve 50 may be closed, and then the water meter 42 either reversed or bypassed. It is apparent that even with the internal shut off valve closed, removal of the water meter will result in flooding of the establishment.

Another approach to this problem would be to place the internal shut off valve for the establishment after the water meter. This approach has two disadvantages. First, it is always desirable to have the internal shut off valve precede the water meter so as to enable the supply of water to the meter to be shut off in case the meter freezes. Second, the preferred embodiment provides some assurance that plumbers, while installing a water meter pursuant to the teachings of this invention, will not inadvertently install the internal shut off valve and the water meter in the prior art arrangement with which they are familiar. By making the internal shut off valve an integral part of the water meter, a plumber will not be apt to mistakenly install the water meter and shut off valve in incorrect positions.

While several embodiments have been described, the teachings of this invention will suggest many other embodiments to those skilled in the art.

I claim:

1. A tamper-proof plumbing arrangement for a water meter in an establishment for eliminating the possibility of a water supply customer reversing or bypassing the water meter, and comprising:
   a. an inlet water pipe into the establishment;
   b. a water meter, connected directly to said inlet water pipe and without an intervening shut off valve, for metering the quantity of water flowing into the establishment;
   c. said meter having as an integral and inseparable component thereof an inside shut off valve for the establishment, whereby the shut off valve cannot be closed to shut off the flow of water into the establishment and then the water meter be reversed or bypassed.

2. Apparatus as set forth in claim 1 wherein said shut off valve is positioned on the inlet side of the water meter.

3. Apparatus as set forth in claim 2 wherein:
   a. said water meter has a gauge which enables a reading of water through the meter;
   b. said water meter has one unitary housing which encloses the components of said shut off valve and the mechanism of said water meter, and also extends around said gauge; and
   c. said unitary housing includes means for securing an unbreakable window over said gauge to allow meter readings to be taken.

4. Apparatus as set forth in claim 3 wherein said unitary housing is formed of one unitary piece of metal.

5. Apparatus as set forth in claim 4 wherein said unitary metal housing has a thinner metal section around said water meter mechanism and around said gauge, and has a thicker metal section around said components of the internal shut off valve to provide a greater resistance against freezing of the components of the internal shut off valve.

6. Apparatus as set forth in claim 5 wherein said unbreakable window is formed of a plastic material.

7. Apparatus as set forth in claim 1 wherein:
   a. said water meter has a gauge which enables a reading of water through the meter;
   b. said water meter has one unitary housing which encloses the components of said shut off valve and the mechanism of said water meter, and also extends around said gauge; and
   c. said unitary housing includes means for securing an unbreakable window over said gauge to allow meter readings to be taken.

8. Apparatus as set forth in claim 7 wherein said unitary housing is formed of one unitary piece of metal.

9. Apparatus as set forth in claim 8 wherein said unitary metal housing has a thinner metal section around said components of the water meter and around said gauge, and has a thicker metal section around said components of the internal shut off valve to provide a greater resistance against freezing of the components of the internal shut off valve.

* * * * *